United States Patent
Ichieda

(10) Patent No.: US 9,465,480 B2
(45) Date of Patent: Oct. 11, 2016

(54) POSITION DETECTION APPARATUS, ADJUSTMENT METHOD, AND ADJUSTMENT PROGRAM

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 14/165,269

(22) Filed: Jan. 27, 2014

(65) Prior Publication Data

US 2014/0218341 A1 Aug. 7, 2014

(30) Foreign Application Priority Data

Feb. 1, 2013 (JP) .................. 2013-018785

(51) Int. Cl.
*G06F 3/041* (2006.01)
*G06F 3/042* (2006.01)

(52) U.S. Cl.
CPC ........... *G06F 3/0418* (2013.01); *G06F 3/0425* (2013.01)

(58) Field of Classification Search
CPC .... G06F 3/0416; G06F 3/042; G06F 3/0421; G06F 3/0423; G06F 3/0425; G06F 3/0428; G06F 3/0418
See application file for complete search history.

(56) References Cited

U.S. PATENT DOCUMENTS

| | | | |
|---|---|---|---|
| 6,710,770 B2 | 3/2004 | Tomasi et al. | |
| 7,453,582 B2 | 11/2008 | Yoshida et al. | |
| 8,116,518 B2 | 2/2012 | Shamaie et al. | |
| 2005/0110964 A1* | 5/2005 | Bell ..................... | G06F 3/011 353/122 |
| 2006/0132432 A1* | 6/2006 | Bell ..................... | G06F 3/011 345/156 |
| 2006/0139314 A1* | 6/2006 | Bell ..................... | A63F 13/02 345/156 |
| 2008/0244468 A1* | 10/2008 | Nishihara ............. | G06F 3/017 715/863 |
| 2009/0116742 A1* | 5/2009 | Nishihara ............. | G06F 3/0425 382/173 |
| 2009/0219253 A1* | 9/2009 | Izadi .................... | G06F 3/0421 345/173 |
| 2010/0039379 A1* | 2/2010 | Hildreth .............. | G06F 3/0418 345/156 |
| 2011/0134080 A1* | 6/2011 | Kiyose ................. | G06F 3/0428 345/175 |
| 2011/0291990 A1* | 12/2011 | Kiyose ................. | F16M 13/02 345/175 |
| 2014/0362052 A1* | 12/2014 | McCaughan ......... | G06F 3/0418 345/175 |

FOREIGN PATENT DOCUMENTS

| | | |
|---|---|---|
| JP | 2005-218132 | 8/2005 |
| JP | 03934658 B | 6/2007 |
| JP | 5015270 B | 8/2012 |
| WO | WO-2008-101183 A | 8/2008 |

OTHER PUBLICATIONS

Shanghai EASI Computer Technology Co., Ltd, FP Board Manual V2.0, Finger Touch Portable Interactive Whiteboard, Jul. 3, 2012, Shanghai, China.

* cited by examiner

*Primary Examiner* — Tom Sheng
(74) *Attorney, Agent, or Firm* — ALG Intellectual Property, LLC

(57) ABSTRACT

A position detection apparatus includes: a radiation section that radiates planar light along a target flat surface; a detection section that captures an image of an area irradiated with the light from the radiation section to detect the position of an object that reflects the light radiated from the radiation section; and an adjustment assistance section that transmits, when adjustment of installation of the radiation section is performed, a predetermined output based on a detection result obtained from the detection section when the detection section detects a reference object for the adjustment placed on the target flat surface.

11 Claims, 16 Drawing Sheets

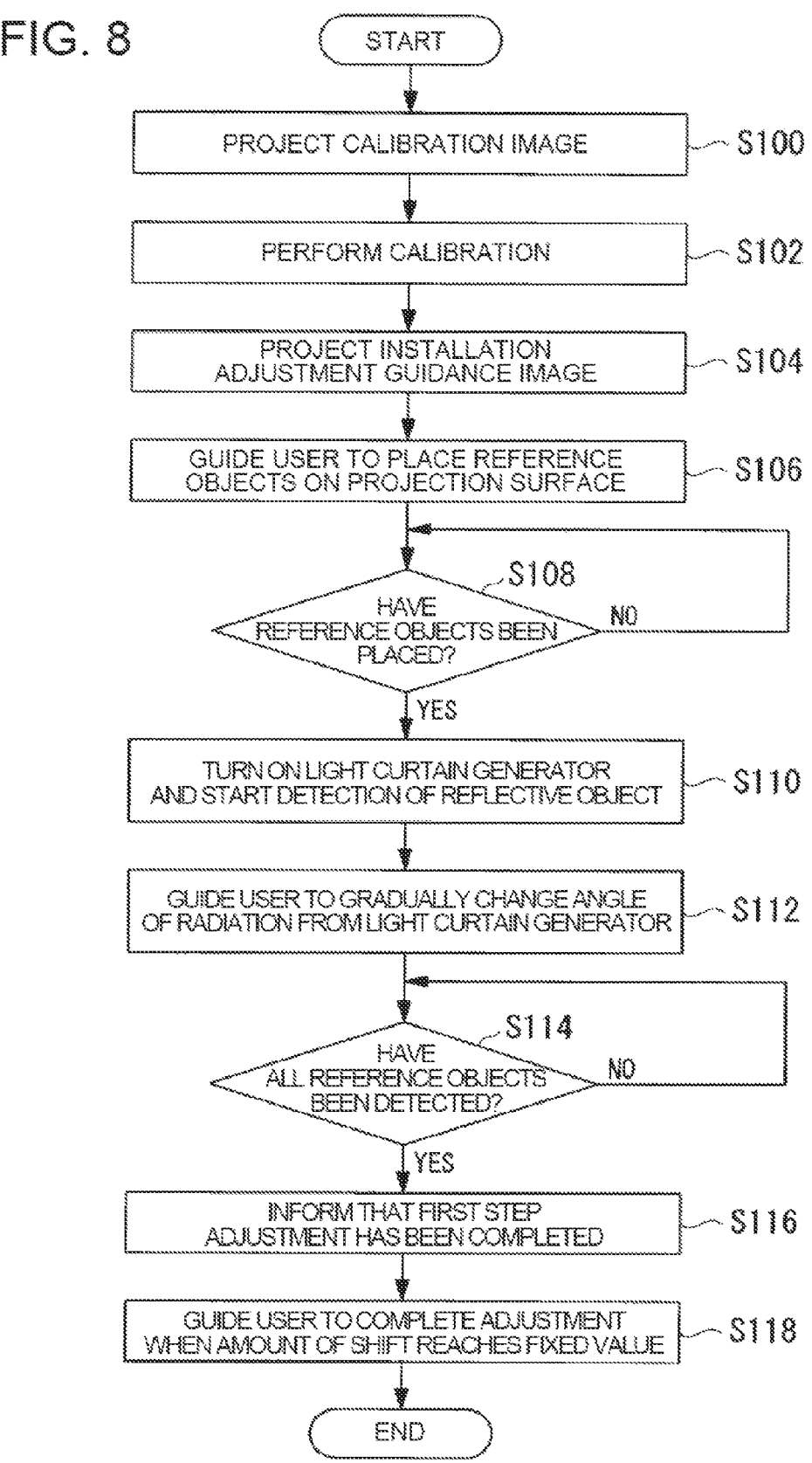

POSITION DETECTION APPARATUS, ADJUSTMENT METHOD, AND ADJUSTMENT PROGRAM

The entire disclosure of Japanese Patent Application No. 2013-018785, filed Feb. 1, 2013 is expressly incorporated by reference herein.

BACKGROUND

1. Technical Field

The present invention relates to a position detection apparatus, an adjustment method, and an adjustment program.

2. Related Art

There is a known apparatus of related art that radiates electromagnetic radiation in a direction parallel to a display surface and captures light reflected off an object close to the display surface to detect the position of the object (see Japanese Patent No. 5,015,270, for example).

Further, in an apparatus similar to the apparatus described above, there is a known method for adjusting the arrangement of components in the apparatus (see FP BOARD MANUAL V2.0 SHANGHAI EASI COMPUTER TECHNOLOGY CO., LTD., URL: [http://www.easitech.com.cn/en/; http://www.gloviewboard.com], for example). In the method, a user touches the four corners of a display surface (surface on which projector projects image) with a finger or any other object, checks whether or not infrared light reflected off the finger or the other object falls within an imaging range of a camera based on a captured image transmitted to a computer, and makes adjustment when the reflected infrared light does not fall within the imaging range by changing the position of the camera away from the current position or reducing the size of the display surface.

The method described above, however, only allows the adjustment to be so made that a marker falls within the display surface but does not allow the adjustment to be so made that the angle of infrared radiation with respect to the display surface is appropriate.

SUMMARY

An advantage of some aspects of the invention is to appropriately adjust the angle of radiation with respect to a target flat surface.

One aspect of a position detection apparatus relates to a position detection apparatus including a radiation section that radiates planar light along a target flat surface, a detection section that captures an image of an area irradiated with the light from the radiation section to detect the position of an object that reflects the light radiated from the radiation section, and an adjustment assistance section that transmits, when adjustment of installation of the radiation section is performed, a predetermined output based on a detection result obtained from the detection section when the detection section detects a reference object for the adjustment placed on the target flat surface.

According to the aspect of the position detection apparatus, the angle of radiation with respect to the target flat surface can be appropriately adjusted.

The aspect of the position detection apparatus may be configured such that, when the adjustment of installation of the radiation section is performed, the angle of radiation from the radiation section is adjusted from an angle away from the target flat surface gradually to an angle closer to the target flat surface.

The aspect of the position detection apparatus may be configured such that the reference object is formed of a plurality of objects the height of which from the target flat surface is substantially fixed in a state in which the reference objects are placed on the target flat surface, and the adjustment assistance section transmits the predetermined output when all the reference objects are detected by the detection section.

The aspect of the position detection apparatus may be configured such that the position detection apparatus further includes a projection section that projects an image on the target flat surface, and when the adjustment of installation of the radiation section is performed, the adjustment assistance section instructs the projection section to project on the target flat surface an image that specifies a position where the reference object should be placed. A user can therefore initiate the adjustment of installation of the radiation section with simple operation.

The aspect of the position detection apparatus may be configured such that the position detection apparatus further includes an information output section that outputs information, and when the adjustment of installation of the radiation section is performed, the adjustment assistance section instructs the information output section to output information that guides placement of the reference object on the target flat surface in accordance with the image projected on the target flat surface and then instructs the information output section to output information that guides adjustment of the angle of radiation from the radiation section from an angle at which a radiation destination is away from the target flat surface toward an angle at which the radiation destination is closer to the target flat surface. The user can therefore readily adjust the installation of the radiation section.

The aspect of the position detection apparatus may be configured such that the position detection apparatus further includes a projection section that projects an image on the target flat surface and an information output section that outputs information, the reference object is formed of a plurality of objects the height of which from the target flat surface is substantially fixed in a state in which the reference objects are placed on the target flat surface, and the adjustment assistance section instructs the projection section to project a predetermined marker in the position of any of the reference objects detected by the detection section and instructs the information output section to output information that guides the adjustment made until discrepancy between the projected marker and the detected reference object reaches a fixed value or falls within a predetermined range. The adjustment of installation of the radiation section can thus be made more appropriately.

The aspect of the position detection apparatus may be configured such that the position detection apparatus further includes a drive section capable of adjusting the angle of radiation from the radiation section, and the adjustment assistance section outputs a signal for stopping the drive section based on a detection result obtained from the detection section when the detection section detects the reference objects.

Another aspects of the position detection apparatus relates to a position detection apparatus including a radiation section that radiates planar light along a target flat surface, a detection section that captures an image of an area irradiated with the light from the radiation section to detect the position of an object that reflects the light radiated from the radiation section, an information output section that outputs information, a projection section that projects an image on the target flat surface, and an adjustment assistance section that instructs, when adjustment of installation of the radiation section is performed, the projection section to project on the target flat surface an image that specifies a position where a reference object for radiation angle adjustment should be placed, instructs the information output section to output first information that guides placement of the reference object on the target flat surface in accordance with the projected image, and then instructs the information output section to output second information, and the second information guides adjustment of the angle of radiation from the radiation section from an angle at which a radiation destination is away from the target flat surface toward an angle at which the radiation destination is closer to the target flat surface until the detection section detects the reference object.

One aspect of an adjustment method relates to an adjustment method used with a position detection apparatus including a radiation section that radiates planar light along a target flat surface and a detection section that captures an image of an area irradiated with the light from the radiation section to detect the position of an object that reflects the light radiated from the radiation section, the method causing the position detection apparatus to transmit a predetermined output, when adjustment of installation of the radiation section is performed, based on a detection result obtained from the detection section when the detection section detects a reference object for the adjustment placed on the target flat surface.

According to the aspect of the adjustment method, the angle of radiation with respect to the target flat surface can be appropriately adjusted.

One aspect of an adjustment program relates to an adjustment program that causes a position detection apparatus including a radiation section that radiates planar light along a target flat surface and a detection section that captures an image of an area irradiated with the light from the radiation section to detect the position of an object that reflects the light radiated from the radiation section to assist adjustment of installation of the radiation section, the program causing, when the angle of radiation from the radiation section is adjusted, the position detection apparatus to carry out a process of causing the detection section to detect a reference object for the radiation angle adjustment placed on the target flat surface and a process of transmitting a predetermined output based on a detection result obtained from the detection section when the detection section detects the reference object.

According to the aspect of the adjustment program, the angle of radiation with respect to the target flat surface can be appropriately adjusted.

BRIEF DESCRIPTION OF THE DRAWINGS

The invention will be described with reference to the accompanying drawings, wherein like numbers reference like elements.

FIG. 8 is an example of a flowchart showing the procedure of processes carried out by an adjustment assistance control section.

DESCRIPTION OF EXEMPLARY EMBODIMENTS

A position detection apparatus, an adjustment method, and an adjustment program according to an embodiment of the invention will be described below with reference to the drawings.

Outline

Figure 1:
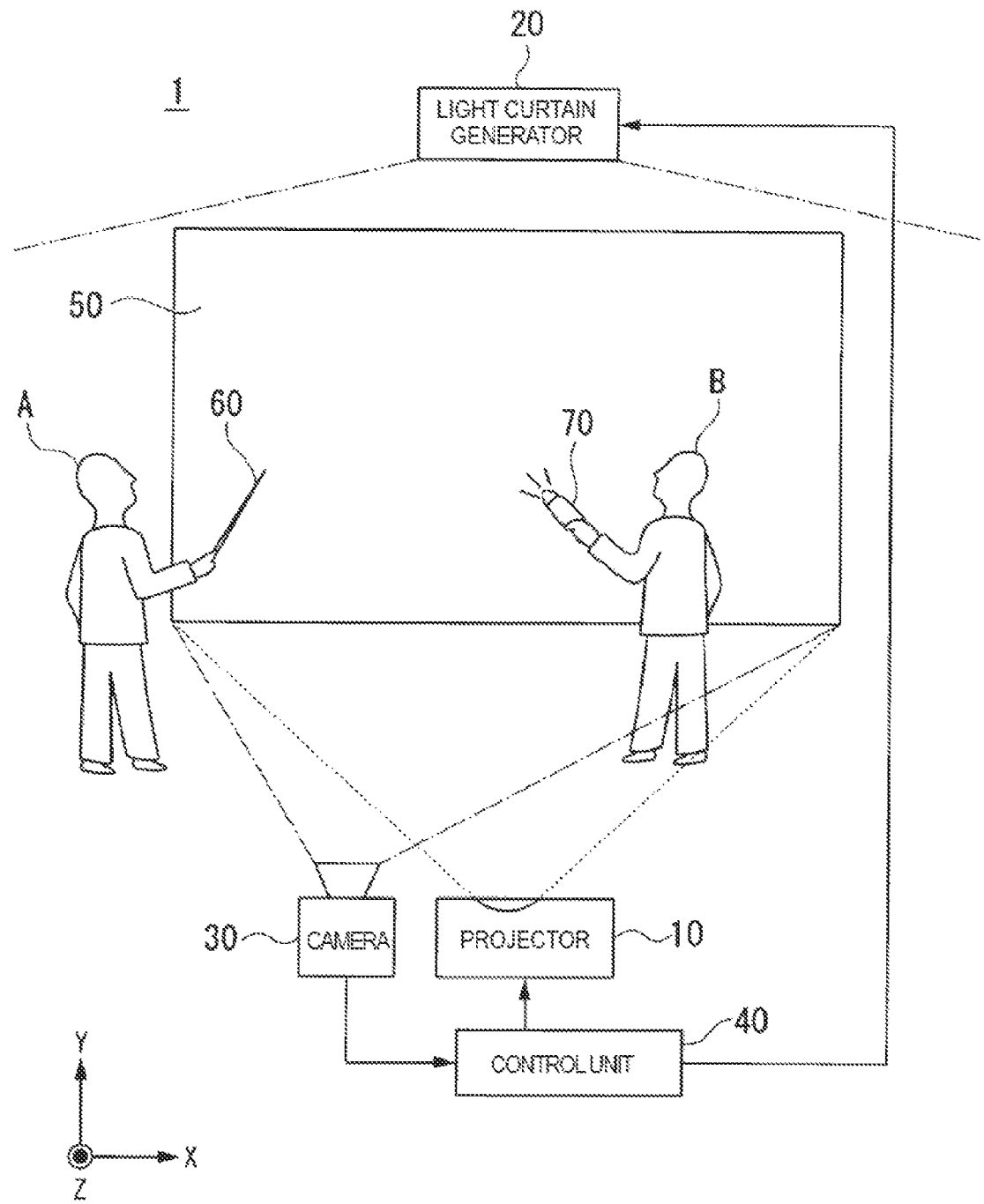
FIG. 1 is a configuration diagram diagrammatically showing how to use an interactive apparatus based on a position detection apparatus according to an embodiment of the invention.

FIG. 1 is a configuration diagram diagrammatically showing how to use an interactive apparatus 1 based on a position detection apparatus according to the embodiment of the invention. The interactive apparatus 1 includes, for example, a projector 10, a light curtain generator 20, a camera 30, and a control unit 40. The position detection apparatus includes, for example, the light curtain generator 20, the camera 30, and the control unit 40.

In the present embodiment, the positional relationship among the components of the interactive apparatus 1 and other factors are described in some cases with reference to an XYZ orthogonal coordinate system shown in FIG. 1 and other figures. In the XYZ orthogonal coordinate system, the X and Y directions are two directions perpendicular to each other on a projection surface 50, and the Z direction is the direction of a normal to the projection surface 50.

In FIG. 1, the projector 10, the light curtain generator 20, the camera 30, and the control unit 40 are shown as separate components only for convenience, and the components may be replaced with integrated hardware. For example, a projector with a camera, a projector with a built-in control unit, a camera with a built-in control unit, or an apparatus in which a camera, a projector, and a control unit are integrated with each other may be used in place of the components described above. Instead, some components of the control unit may be built in the camera and the other components of the control unit may be built in the projector.

The projector 10 projects an image on the projection surface (display surface) 50. An image projected by the projector 10 is produced, for example, by the control unit 40. The projection surface 50 can be a wall, a screen, or any other arbitrary flat surface.

Figure 2:
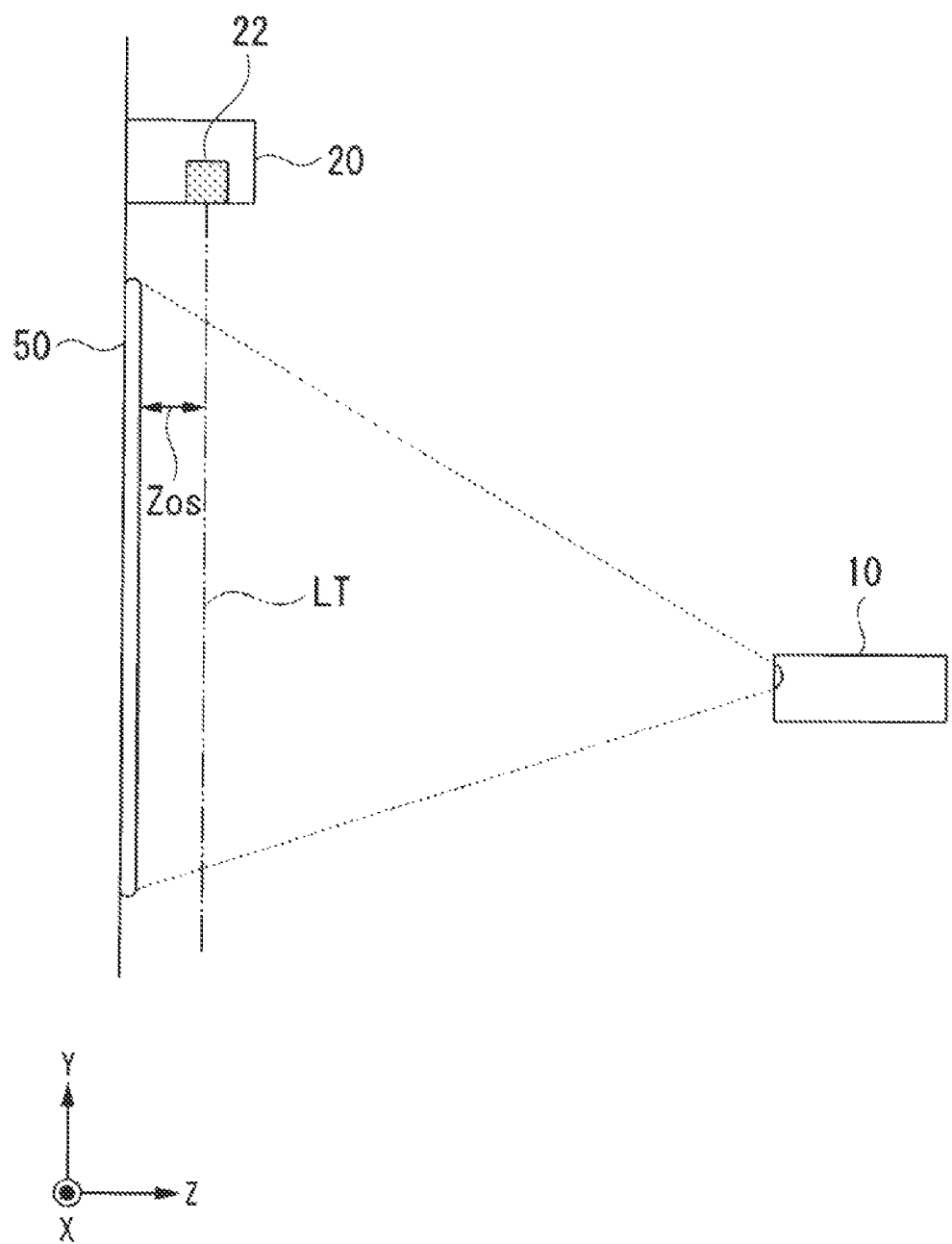
FIG. 2 shows the position where a light curtain generator is attached with respect to a projection surface and the direction of radiated light.

The light curtain generator 20 radiates planar light extending along the projection surface 50. In the example shown in FIG. 1, the light curtain generator 20 is attached, for example, in a position above the projection surface 50 and radiates light in a wavelength range including infrared light (light in infrared region including wavelengths equal to or longer than about 900 [nm], for example) across a fan-shaped flat area that covers the projection surface 50. FIG. 2 shows the position where the light curtain generator 20 is attached with respect to the projection surface 50 and the direction of radiated light LT. FIG. 2 is actually a side view of the light curtain generator 20 and the projection surface 50 viewed along the X direction in FIG. 1. A light emitter 22 is so attached to the light curtain generator 20 that the light emitter 22 is slightly offset from the projection surface 50 in the Z direction and radiates the light LT substantially parallel to the projection surface 50 but shifted from the projection surface 50 by a distance Zos according to the amount of offset, as shown in FIG. 2. The light radiated from the light curtain generator 20 may instead be light other than infrared light (visible light, for example). An example of the visible light may include red light having a wavelength of about 780 [nm].

Figure 3:
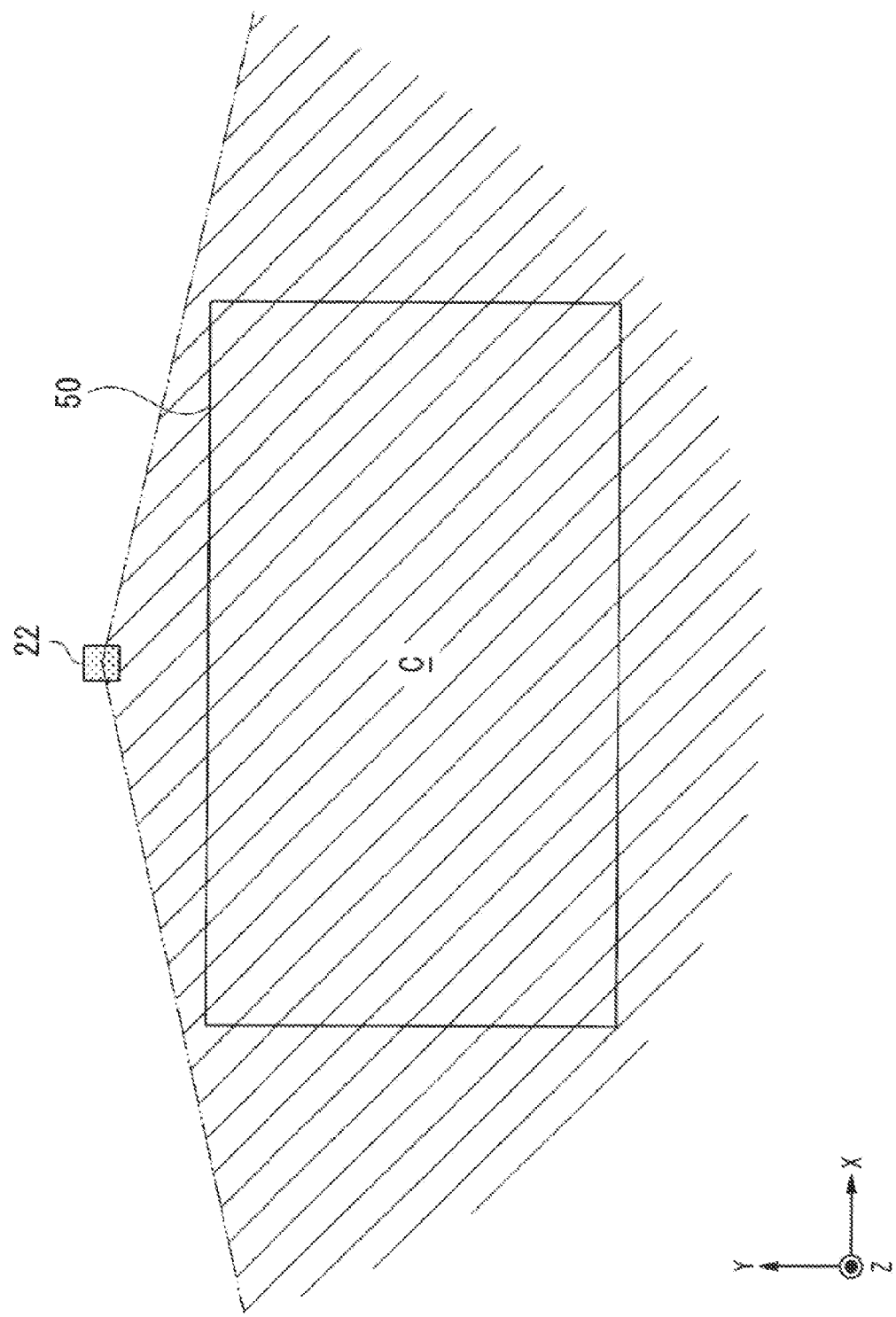
FIG. 3 shows a radiation area over which a light emitter in the light curtain generator emits light.

The light emitter 22 is, for example, an LED (light emitting diode) or an LD (laser diode) to which a polymer lens, a Powell lens, or any other optical system member is attached. The light emitter 22 is held by a mechanism (adjustment mechanism) capable of adjusting the distance Zos and the angle of radiation (installation adjustment). The adjustment mechanism may be a mechanism that allows a user to manually adjust the distance and the angle of radiation or may be a mechanism that can automatically adjust the distance Zos and the angle of radiation in accordance with an instruction signal inputted, for example, from the control unit 40. It is assumed in the following description that the adjustment mechanism is a mechanism that allows the user to manually adjust the distance and the angle of radiation. FIG. 3 shows a radiation area C over which the light emitter 22 in the light curtain generator 20 emits light.

The description resumes with reference to FIG. 1. The camera 30 captures an image of the projection surface 50 and outputs data on the captured image to the control unit 40. For example, an infrared light filter is attached to the camera 30 to allow the camera 30 to selectively receive light in the same wavelength range as that of the light radiated from the light curtain generator 20. A mechanism capable of attaching and detaching the infrared light filter to and from the camera 30 is preferably attached to the camera 30.

The control unit 40 controls the entire interactive apparatus 1. The control unit 40 analyzes, as one function thereof, an image captured with the camera 30 to detect a position pointed by the user (on-image position). The control unit 40 further performs control for assisting adjustment of installation of the light curtain generator 20, for example, at the time of startup of the interactive apparatus 1.

A user A is pointing a specific location on the projection surface 50 with a pointing stick 60 in FIG. 1. The pointing stick 60, when it approaches the projection surface 50 to a point where the distance to the projection surface 50 is equal to or smaller than the distance Zos (see FIG. 2), reflects the infrared light radiated from the light curtain generator 20. The camera 30 captures the reflected light, and the control unit 40 detects the position where the reflection has occurred. The same holds true for, for example, a case where a finger of the user or any other object, instead of the pointing stick 60, points a specific location on the projection surface 5.

Further, a user B is pointing a specific location on the projection surface 50 with a light pen 70 in FIG. 1. The light pen 70 is configured to emit light from its nib when the nib comes into contact with an object. The light emitted from the light pen 70, for example, belongs to a wavelength region comparable with that of the light radiated from the light curtain generator 20. Therefore, the camera 30 captures the light emitted from the light pen 70, and the control unit 40 detects the light emission position, as in the case of the reflected light produced when the pointing stick 60 reflects the infrared light radiated from the light curtain generator 20.

Description of Each Component

Figure 4:
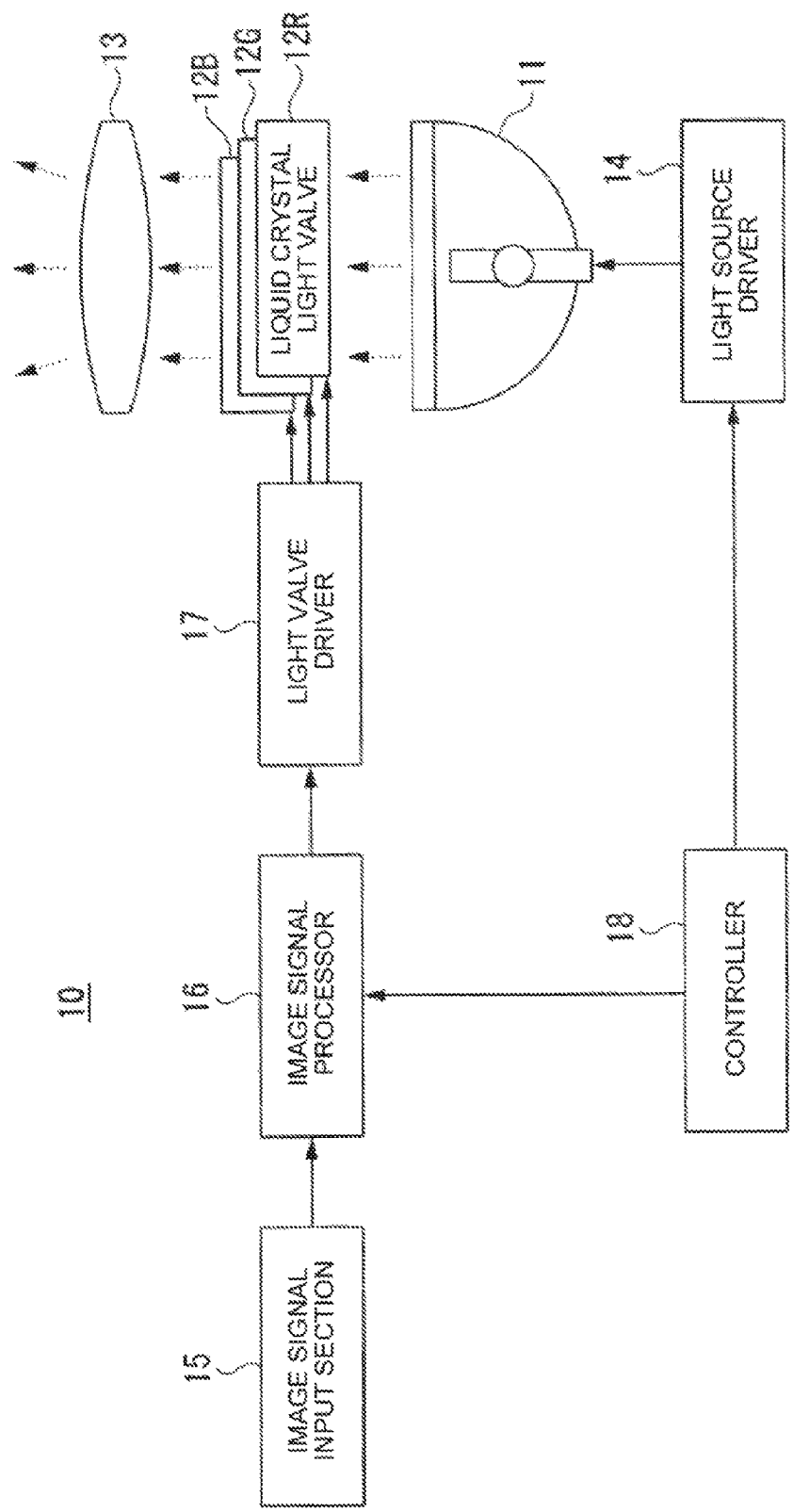
FIG. 4 is a configuration diagram showing an example of the configuration of a projector.

FIG. 4 is a configuration diagram showing an example of the configuration of the projector 10. The projector 10 includes, for example, a light source 11, liquid crystal light valves 12R, 12G, and 12B, each of which serves as a light modulator, a lens 13, a light source driver 14, an image signal input section 15, an image signal processor 16, a light valve driver 17, and a controller 18.

The light source 11 includes a discharge-type light source lamp formed, for example, of an ultrahigh-pressure mercury lamp or a metal halide lamp, and a reflector that reflects light radiated from the light source lamp toward the liquid crystal light valves 12R, 12G, and 12B. The light having exited out of the light source 11 is converted, for example, by an optical integration system into light having a substantially uniform intensity distribution, separated by a color separation system into red R, green G, and blue B color light components, which are three primary color light components, and then incident on the liquid crystal light valves 12R, 12G, and 12B, respectively. The liquid crystal light valves 12R, 12G, and 12B correspond to the red R, green G, and blue B respectively and are each formed, for example, of a liquid crystal panel in which a pair of transparent substrates seal a liquid crystal material. Each of the liquid crystal light valves 12R, 12G, and 12B, for example, has a plurality of pixels arranged in a matrix, and a drive voltage is applicable to the liquid crystal material on a pixel basis. When the light valve driver 17 applies a drive voltage according to inputted image information to each of the pixels, the light transmittance of the pixel is set in accordance with the image information. The light having exited out of the light source 11 is therefore modulated when passing through the liquid crystal light valves 12R, 12G, and 12B, and images according to image information are formed in association with the color light fluxes. The thus formed color images are combined with each other on a pixel basis by a color combining system (not shown) into a color image, which is then projected through the lens 13 toward the projection surface 50. The light source 11 does not necessarily include a discharge-type light source but may include an LED, a semiconductor laser, or any other solid-state light source. Each of the light modulators is not limited to a liquid crystal light valve but may be a DMD (digital mirror device) or any other suitable device.

The light source driver 14, which includes, for example, an inverter that converts inputted DC current into AC current having a rectangular waveform and an igniter that causes dielectric breakdown between electrodes of the light source lamp to facilitate startup of the light source lamp, performs light-on control on the light source 11 based on an instruction from the controller 18. The image signal input section 15 receives an image signal from the control unit 40. The image signal input section 15 then converts the received image signal into image information in a form that can be processed by the image signal processor 16 and outputs the image information to the image signal processor 16. The image signal processor 16 converts the image information inputted from the image signal input section 15 into image data representing the grayscale of each of the pixels in the liquid crystal light valves 12R, 12G, and 12B. The controller 18 includes, for example, a CPU (central processing unit) and a nonvolatile memory and executes a program stored in the nonvolatile memory to control the operation of the projector 10.

Figure 5:
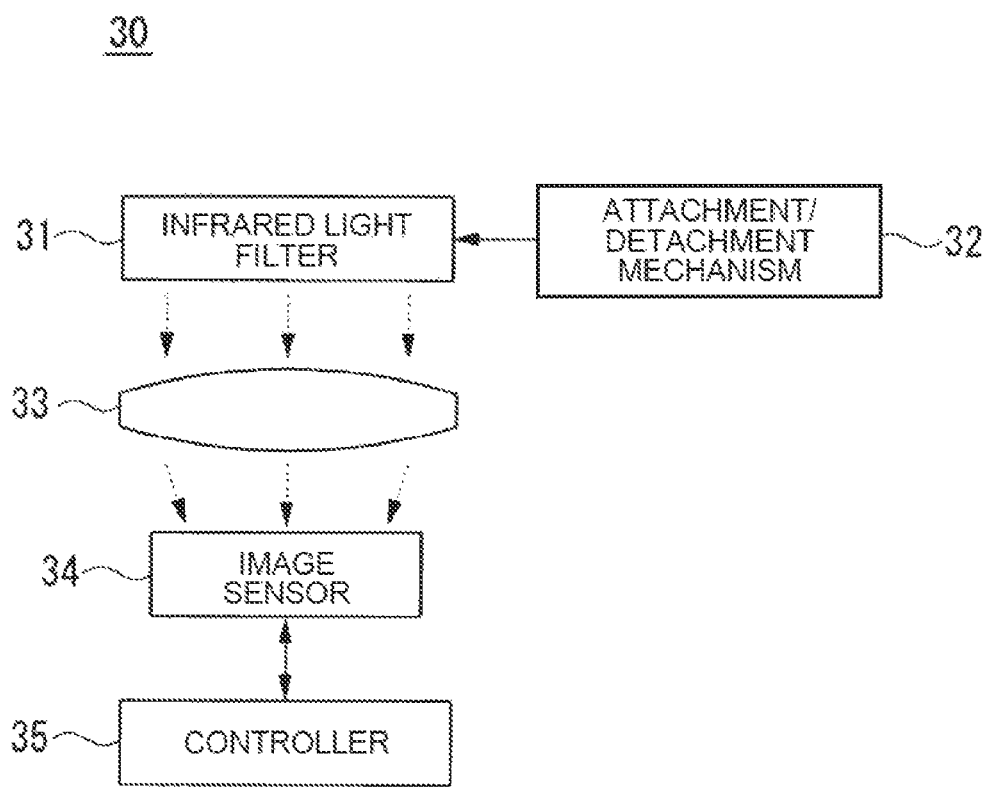
FIG. 5 is a configuration diagram showing an example of the configuration of a camera.

FIG. 5 is a configuration diagram showing an example of the configuration of the camera 30. The camera 30 includes an infrared light filter 31, an attachment/detachment mechanism 32, a lens 33, an image sensor 34, and a controller 35. The infrared light filter 31 transmits light in a wavelength range including infrared light and blocks light in the other wavelength ranges. The attachment/detachment mechanism 32 holds the infrared light filter 31 in either a position where the infrared light filter 31 covers the lens 33 or a position where the infrared light filter 31 unblocks the lens 33. The infrared light filter 31 is removed so that it unblocks the lens 33, for example, when calibration, which will be described later, is performed. The light incident on the camera 30 passes through the infrared light filter 31 and the lens 33 and impinges on the image sensor 34. The image sensor 34 is based, for example, on a CCD (charge coupled device), a CMOS (complementary metal oxide semiconductor) device, or any other solid-state imaging device. The controller 35 is, for example, a microcomputer or an electronic circuit and adjusts the shutter speed and the imaging cycle of the camera 30. The controller 35 then amplifies data outputted from an output circuit of the image sensor 34 by a factor of a predetermined gain or otherwise processes the data and outputs the resultant image data to the control unit 40. The infrared light filter 31 is not necessarily disposed in the position shown in FIG. 5 and may, for example, be disposed in a position between the lens 33 and the image sensor 34. When the light curtain generator 20 radiates visible light, the infrared light filter 31 and the attachment/detachment mechanism 32 may be omitted.

Figure 6:
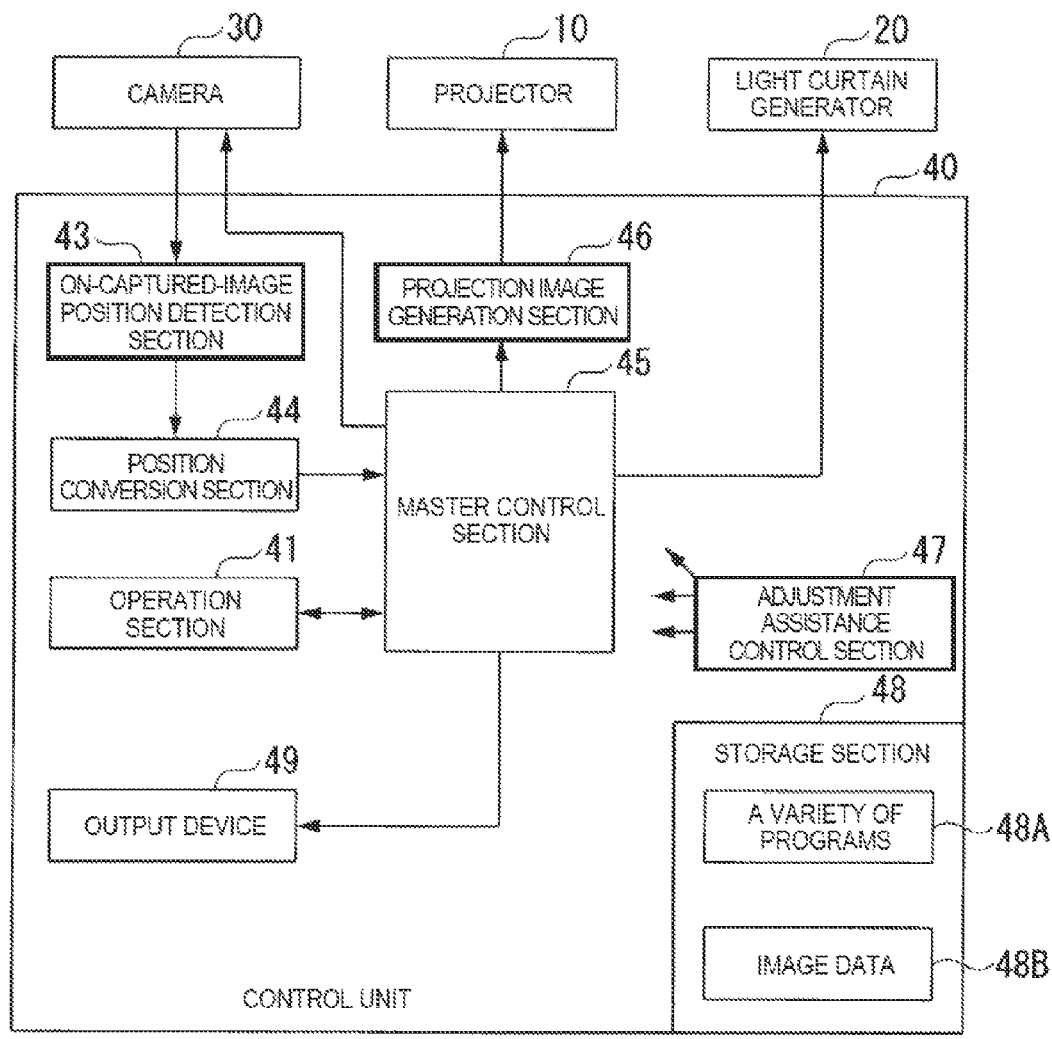
FIG. 6 is a configuration diagram showing an example of the functional configuration of a control unit.

FIG. 6 is a configuration diagram showing an example of the functional configuration of the control unit 40. The control unit 40 includes an operation section 41, an on-captured-image position detection section 43, a position conversion section 44, a master control section 45, a projection image generation section 46, an adjustment assistance control section 47, a storage section 48, and output devices 49, such as a loudspeaker, a buzzer, and a liquid crystal display. The storage section 48 is, for example, a ROM (read only memory), a RAM (random access memory), an HDD (hard disk drive), an SSD (solid state drive), an SD card, or any other storage device. The storage section 48 stores a variety of programs 48A, image data 48B, and other data. The control unit 40 further includes a CPU or any other processor. Each of the on-captured-image position detection section 43, the position conversion section 44, the master control section 45, the projection image generation section 46, the adjustment assistance control section 47 is, for example, a software function section that functions when the CPU executes the variety of programs 48A. All the function sections are not necessarily software function sections and may be independent hardware function sections, such as an LSI (large scale integration) or an electronic circuit.

The operation section 41 is, for example, an operation panel on which a plurality of buttons (keys) are arranged. The operation section 41 may be a remote control or a device that specifies the light pen 70 or other input devices (keyboard, mouse, touch panel). The operation section 41 receives operation performed by the user and outputs a signal representing the type of the performed operation to the master control section 45. Any other externally connected control device (such as personal computer) may accept operation performed by the user, and the operation section 41 may receive a signal representing the type of the operation from the other control device and output the signal to the master control section 45.

The on-captured-image position detection section 43 detects a position which is present on an image captured with the camera 30 and inputted therefrom and where the light radiated from the light curtain generator 20 is reflected or the light pen 70 emits light (the position is hereinafter referred to as "pointed position"). The on-captured-image position detection section 43 detects the position of a pixel having brightness equal to or greater than a specific value in an image as the pointed position. The on-captured-image position detection section 43 can distinguish between the light radiated from the light curtain generator 20 and then reflected off an object and the light emitted from the light pen 70. The light distinguishing operation described above can be performed, for example, by causing the light curtain generator 20 and the light pen 70 to radiate light intermittently in a predetermined cycle but in different periods. The on-captured-image position detection section 43, when it detects light in a period (cycle) during which the light curtain generator 20 radiates light, judges that the light has been reflected off the pointing stick 60, a finger, or any other object, whereas the on-captured-image position detection section 43, when it detects light in a period (cycle) during which the light pen 70 radiates light, judges that the light has been emitted from the light pen 70.

The position conversion section 44 converts an on-captured-image pointed position detected by the on-captured-image position detection section 43 into an on-projection-image pointed position and outputs the on-projection-image pointed position to the master control section 45. For example, the storage section 48 stores a conversion map that relates the position of each pixel on an image captured with the camera 30 to a position on a projection image, and the position conversion section 44 refers to the conversion map to convert an on-captured-image pointed position into an on-projection-image pointed position. The position conversion section 44 performs calibration for creating or correcting the conversion map in response, for example, to an instruction from the adjustment assistance control section 47. The calibration may be performed in a completely automatic manner, or part of the calibration may require user's manual operation.

Figure 7A:
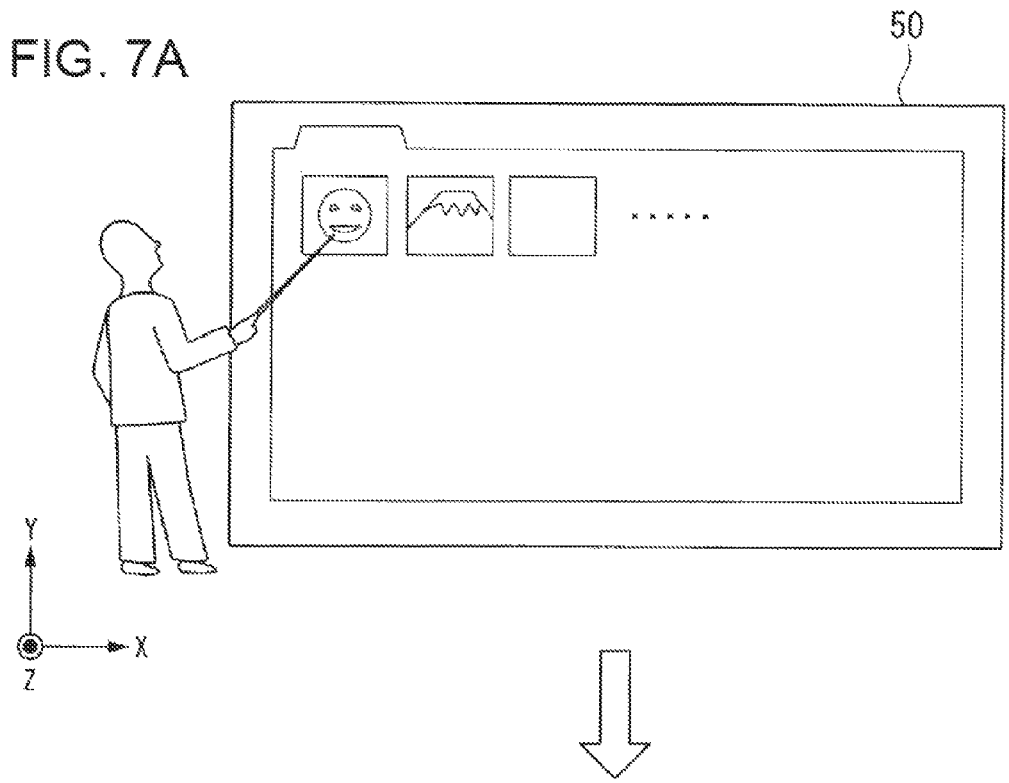
FIGS. 7A and 7B show that images are listed on the projection surface and that when a user points one of the images, the pointed image is enlarged and displayed.
Figure 7B:
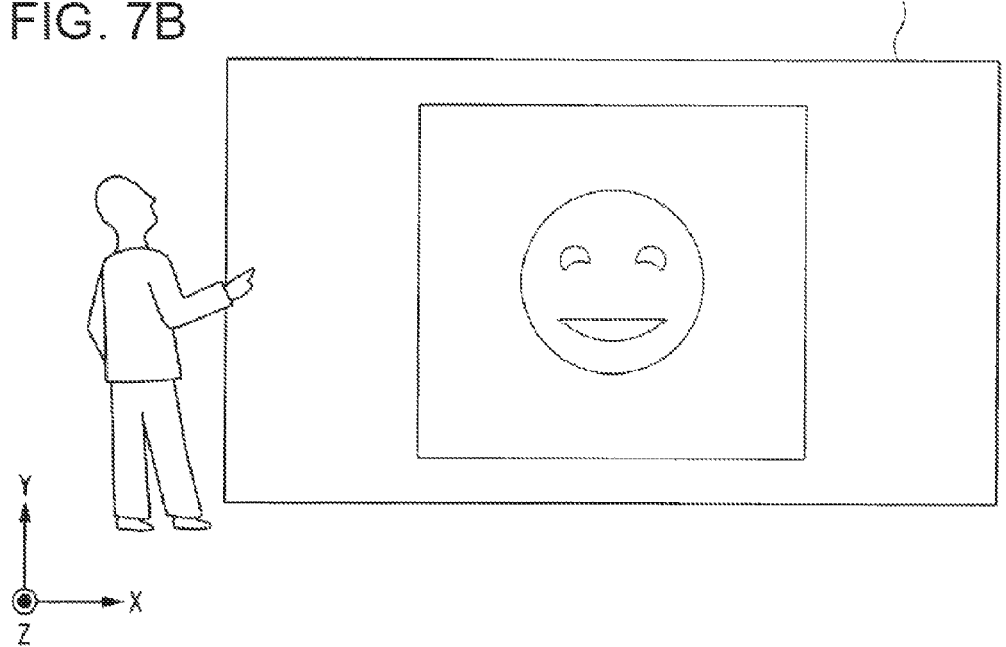

The master control section 45 reads image data 48B from the storage section 48 in accordance, for example, with an instruction from the user and instructs the projection image generation section 46 to generate a projection image based on the read image data 48B. The master control section further instructs the projection image generation section 46 to generate a projection image containing graphic switches. When the user points any of the switches (for example, with pointing stick 60 or finger), the master controller section 45 judges that the switch has been operated and carries out a predetermined process (such as image switching). The interactive apparatus 1 that carries out the processes described above allows the projection surface 50 to function as if it were a touch panel. FIGS. 7A and 7B show that images are listed on the projection surface 50 and that when the user points one of the images, the pointed image is enlarged and displayed. FIG. 7A shows that images are listed on the projection surface, and FIG. 7B shows that a pointed image (image of human face) is enlarged and displayed.

Further, the master control section 45, for example, superimposes and displays a marker or any other object in an on-projection-image position corresponding to a position pointed with the pointing stick 60, a finger, or any other object. Moreover, the master controller section 45, for example, superimposes and displays the trajectory of the position pointed with the light pen 70 on the projection image. The user can thus draw a line on the projection image or write a character or a picture thereon. The master controller section 45 further performs on/off control on the light curtain generator 20 in accordance, for example, with an instruction from the user.

The projection image generation section 46 generates a projection image to be projected by the projector 10 based on an image specified by the master control section 45, an image inputted from an external apparatus, or any other image and outputs the generated projection image to the projector 10.

Adjustment of Installation of Light Curtain Generator 20

The adjustment assistance control section 47 carries out processes described below to assist adjustment of installation of the light curtain generator 20. FIG. 8 is an example of a flowchart showing the procedure of the processes carried out by the adjustment assistance control section 47. The processes in the flowchart shown in FIG. 8 start, for example, in response to user' operation performed on the operation section 41 after the interactive apparatus 1 is activated, a projection image is projected on the projection surface 50, and trapezoidal correction and other types of image processing are performed on the projection image.

Figure 9:
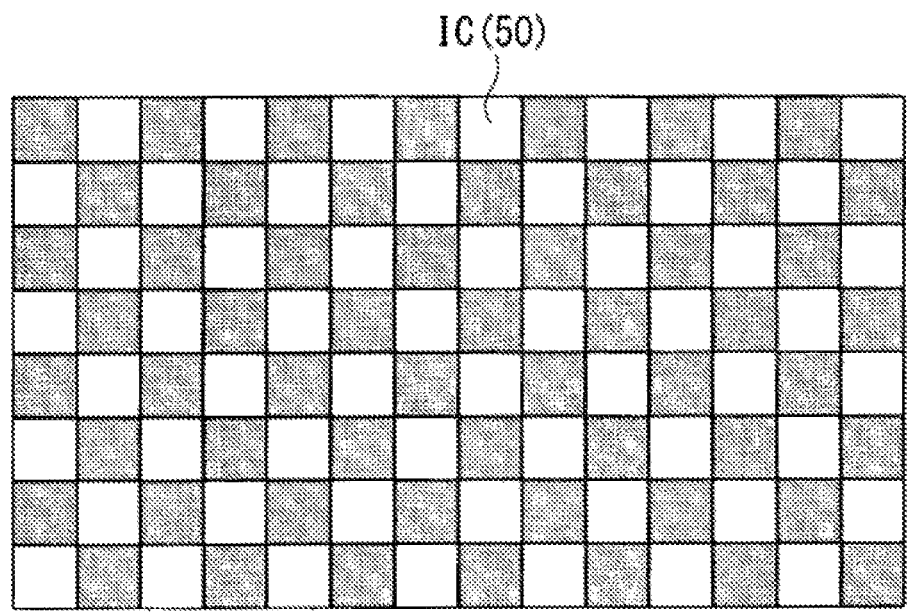
FIG. 9 shows an example of a calibration image.

The adjustment assistance control section 47 first instructs the projection image generation section 46 to project a calibration image on the projection surface 50 (step S100). FIG. 9 shows an example of the calibration image IC. The calibration image IC contains, for example, a checker pattern in which rectangular bright color portions and rectangular dark color portions are alternately arranged in the horizontal and vertical directions, as shown in FIG. 9.

The adjustment assistance control section 47 then performs the calibration and instructs the position conversion section 44 to correct the conversion map, which relates the position of each pixel on an image captured with the camera 30 to a position on a projection image (step S102). Specifically, the position conversion section 44 corrects the conversion map by deriving the coordinates of contact points in an image captured with the camera 30 where corners of dark color portions are in contact with each other and comparing the derived coordinates with the coordinates of the contact points in the pre-generated calibration image. The calibration is not necessarily performed as described above, and the conversion map may, for example, be corrected as follows:

The user points a specific position on the calibration image; the pointed position is detected based on an image captured with the camera 30; and the detected position is compared with the position known in advance.

Figure 10:
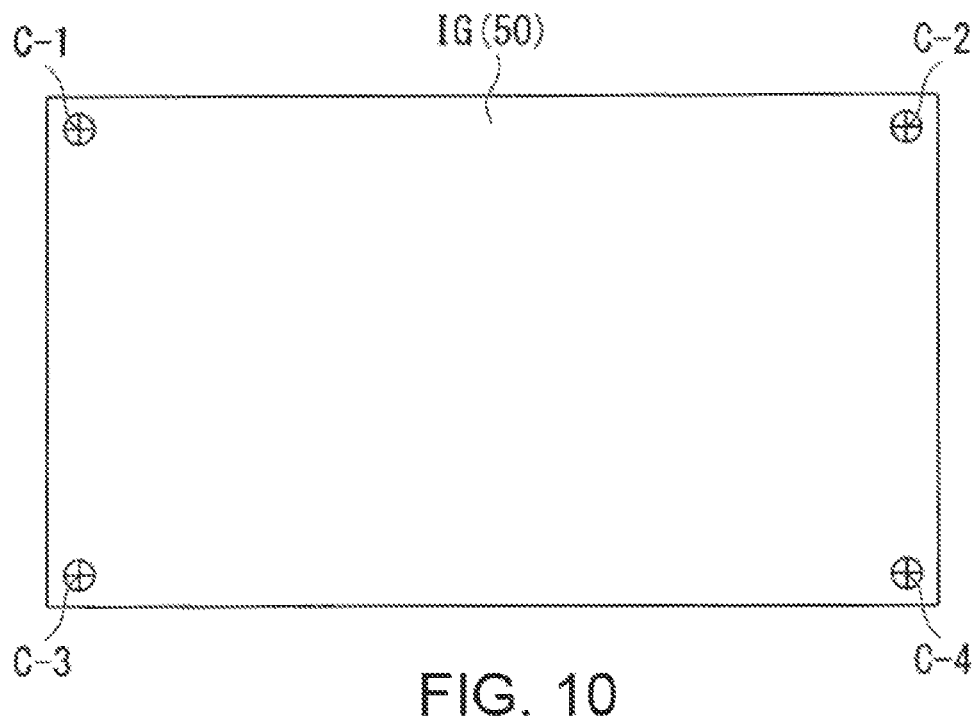
FIG. 10 shows an example of an installation adjustment guidance image.

The adjustment assistance control section 47 then instructs the projection image generation section 46 to project an installation adjustment guidance image IG on the projection surface 50 (step S104). FIG. 10 shows an example of the installation adjustment guidance image IG. The installation adjustment guidance image IG is, for example, an image in which crossed lines and a circle that surrounds the crossed lines are displayed in each of reference object placement positions (C-1 to C-4) where a plurality of reference objects that will be described later should be placed. The reference object placement positions are set at locations close to the four corners of the projection surface 50. The installation adjustment guidance image IG may contain information that guides the user to install the light curtain generator 20 in an intended position (for example, a message that guides the user to install the light curtain generator 20 above the projection surface 50 along the center line thereof or a figure that guides the user to install the light curtain generator 20 in an intended position).

The adjustment assistance control section 47 then instructs the projection image generation section 46 to project on the projection surface 50 information that guides the user to place the reference objects in the reference object placement positions in the installation adjustment guidance image IG (step S106).

Figure 11:
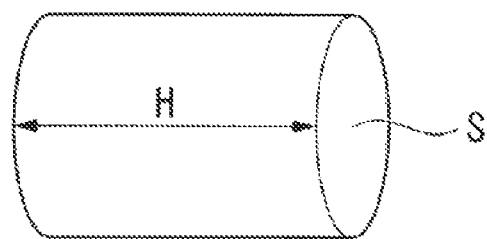
FIG. 11 shows an example of the exterior shape of a reference object.

FIG. 11 shows an example of the exterior shape of each of the reference objects. Each of the reference objects has a substantially cylindrical exterior shape, as shown in FIG. 11. The reference objects are so prepared that the number of them is equal to the number of reference object placement positions (four in the example shown in FIG. 10). The reference objects are called D-1 to D-4 in the following description. Each of the reference objects D-1 to D-4 is a cylinder having a height H, which is, for example, about 1 [nm]. The height H of the reference objects D-1 to D-4 is preferably a value close to the distance Zos according to the offset of the light emitter 22 from the projection surface 50 described above (approximately Zos×1.0 to Zos×2.0, for example). A magnet, a double-sided adhesive tape, an adhesive, a needle, or any other object is attached to one bottom surface (circular surface) S of each of the reference objects D-1 to D-4, whereby the bottom surface S can be fixed to or removed from the projection surface 50. With the reference objects D-1 to D-4 placed on the projection surface 50, the height of the reference objects D-1 to D-4 from the projection surface 50 is therefore equal to the height H described above and substantially constant. The user places the reference objects D-1 to D-4 on the projection surface 50 in such a way that the center of the bottom surface S of each of the reference objects D-1 to D-4 coincides with the corresponding one of the reference object placement positions (intersection point of crossed lines) C-1 to C-4.

The adjustment assistance control section 47 then waits until the reference objects D-1 to D-4 have been placed (step S108). The user, for example, performs predetermined operation on the operation section 41 to notify the adjustment assistance control section 47 that the reference objects have been placed. When the reference objects D-1 to D-4 have been placed, the adjustment assistance control section 47 requests the master control section 45 to supply the light curtain generator 20 with electric power so that the light curtain generator 20 is turned on and start detection of a reflective object that reflects the infrared light (step S110).

Figure 12:
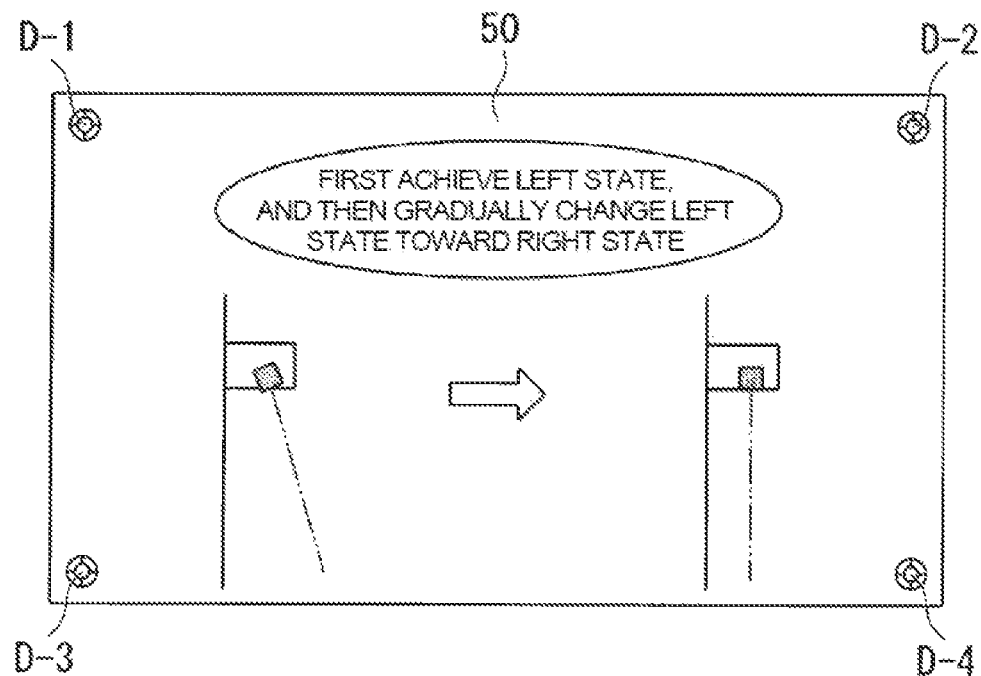
FIG. 12 shows that information that guides the user to gradually change the angle of radiation from the light curtain generator is projected on the projection surface.
Figure 13:
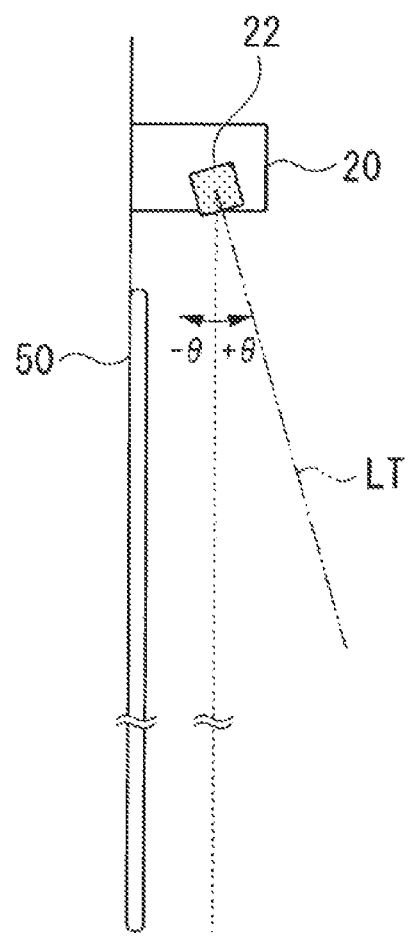
FIG. 13 is a descriptive diagram for describing adjustment of the angle of radiation from the light curtain generator.

The adjustment assistance control section 47 then instructs the projection image generation section 46 to project on the projection surface 50 information that guides the user to gradually change the angle of radiation from the light curtain generator 20 (step S112). FIG. 12 shows that the information that guides the user to gradually change the angle of radiation from the light curtain generator 20 is projected on the projection surface 50. For example, on the right and left sides of the projection surface 50 are projected diagrammatic figures showing different angles of radiation from the light curtain generator 20, and on the projection surface 50 is also projected an instruction sentence "First achieve the left state, and then gradually change the left state toward the right state," as shown in FIG. 12. FIG. 13 is a descriptive diagram for describing the adjustment of the angle of radiation from the light curtain generator 20. The user follows the guidance information described above to gradually change the angle θ of radiation from the light curtain generator from an angle at which the radiation destination is away from the projection surface 50 ("+θ" in FIG. 13) toward an angle at which the radiation destination is closer to the projection surface 50 ("−θ" in FIG. 13).

Figure 14:
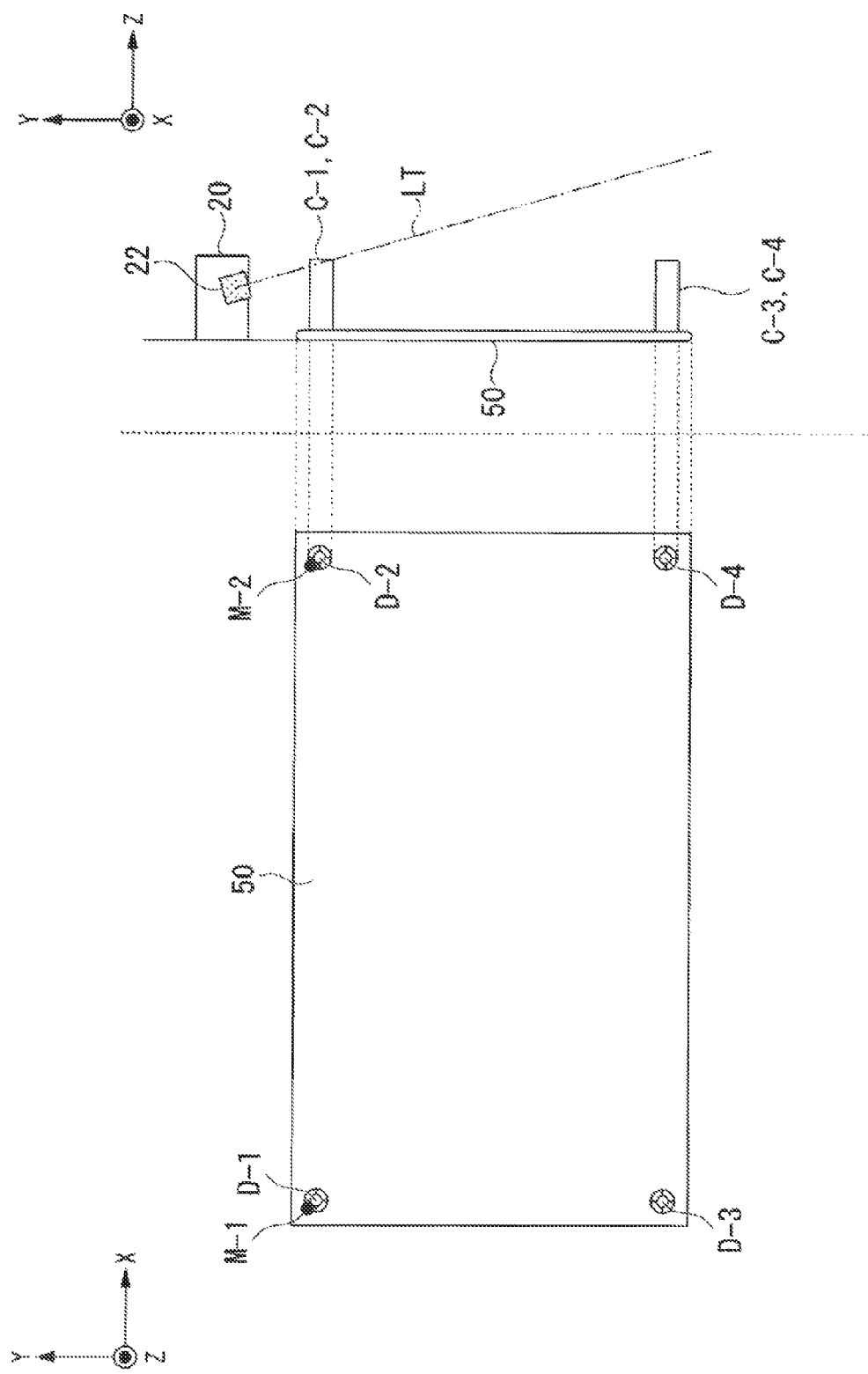
FIG. 14 shows a state in which only two reference objects have been detected and markers have been displayed and also shows the angle of radiation from the light curtain generator in this state.

While the angle of radiation from the light curtain generator 20 is being adjusted, the control unit 40 detects a reflective object that reflects the infrared light based on an image captured with the camera 30. The control unit 40 displays a marker in the position of the detected reflective object (reference object in the description). FIG. 14 shows a state in which only two reference objects D-1 and D-2 among the reference objects D-1 to D-4 have been detected and markers M-1 and M-2 have been displayed and also shows the angle of radiation from the light curtain generator 20 in this state. When the angle of radiation from the light curtain generator 20 is inclined toward the + side as shown in FIG. 14, only the reference objects D-1 and D-2, which are closer to the light curtain generator 20, are detected but the reference objects D-3 and D-4, which are farther from the light curtain generator 20, are not detected in some cases. In the state shown in FIG. 14, on the lower side of the projection surface 50, an object is undesirably detected in a position farther away from the projection surface 50 than intended (which means that sensitivity is too high). In this case, the user may not be able to use the apparatus comfortably.

Figure 15:
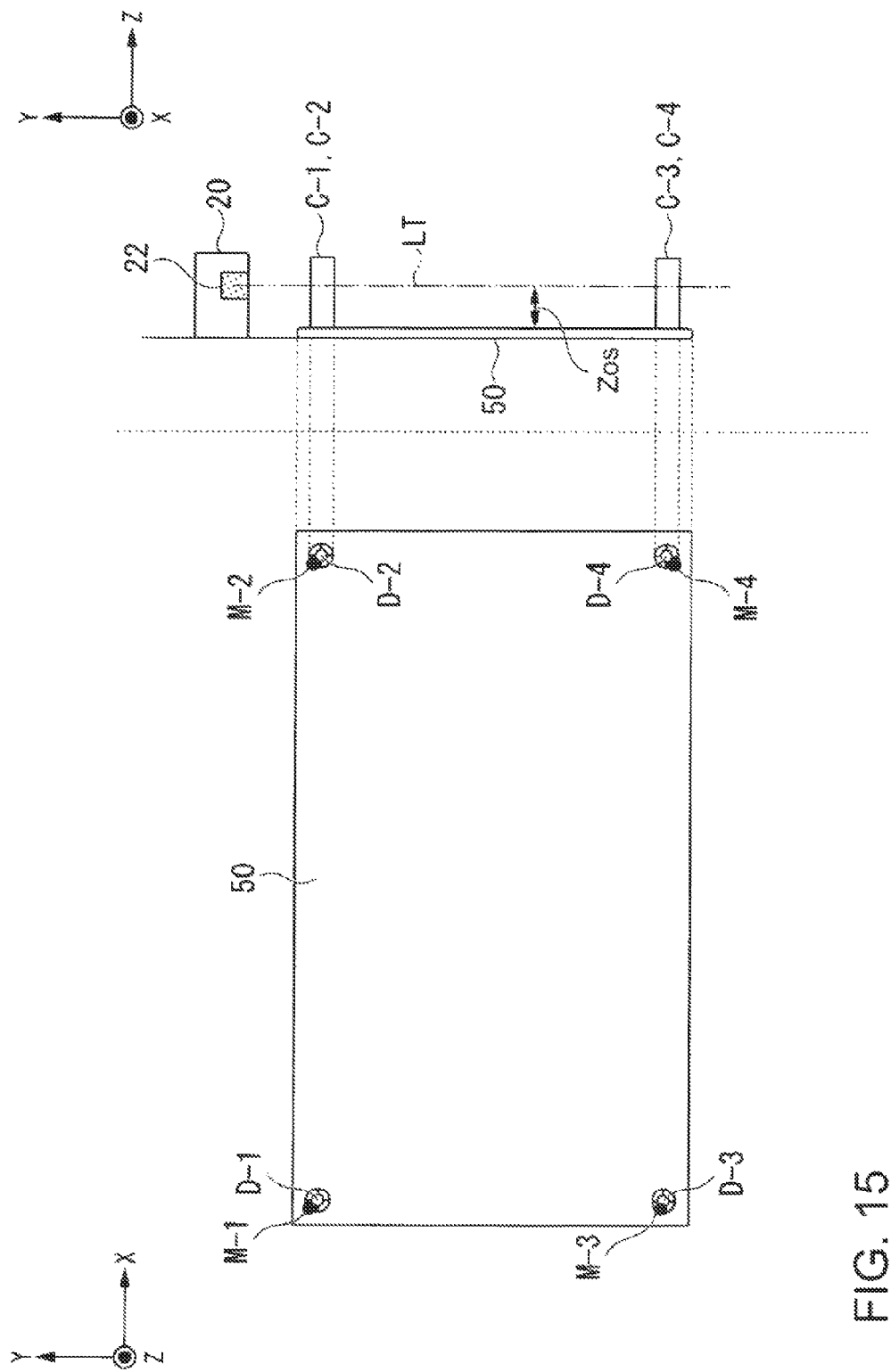
FIG. 15 shows a state in which all the reference objects have been detected and markers have been displayed and also shows the angle of radiation from the light curtain generator in this state.

The adjustment assistance control section 47 then waits until all the reference objects D-1 to D-4 have been detected (step S114). After all the reference objects D-1 to D-4 have been detected, the adjustment assistance control section 47 instructs the projection image generation section 46 to project on the projection surface 50 information that informs the user that first step adjustment has been completed (step S116). FIG. 15 shows a state in which all the reference objects D-1 to D-4 have been detected and markers have been displayed and also shows the angle of radiation from the light curtain generator 20 in this state. After all the reference objects D-1 to D-4 have been detected, the adjustment assistance control section 47 may, for example, output audio by using any of the output devices 49. In the state shown in FIG. 15, since an object is detected at a substantially fixed distance from the projection surface 50 across the projection surface 50, the user can use the apparatus satisfactorily.

The adjustment assistance control section 47 then makes adjustment (*) within the range where all the reference objects D-1 to D-4 and the corresponding markers M-1 to M-4 are displayed until the amount of shift of each of the markers M-1 to M-4 from the corresponding one of the reference objects D-1 to D-4 (shift vector) reaches a fixed value or falls within a predetermined range and instructs the projection image generation section 46 to project on the projection surface 50 information that guides the user to complete the adjustment when the amounts of shift reach the fixed value or fall within the predetermined range (step S118). The adjustment (*) may, for example, include not only the adjustment of the angle of radiation with respect to the projection surface 50 but also adjustment of the distance Zos and/or adjustment of the angle of radiation in a plane parallel to the projection surface 50 (adjustment of the angle of radiation around the Z direction shown in FIGS. 7A and 7B and other figures).

Figure 16C:
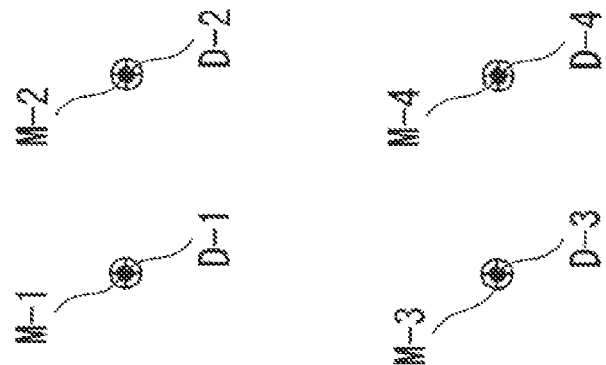
FIGS. 16A to 16C show examples of the amounts of shift of the markers from the reference objects.
Figure 16B:
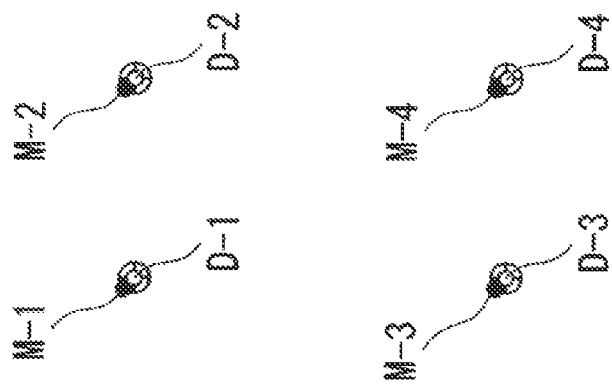
Figure 16A:
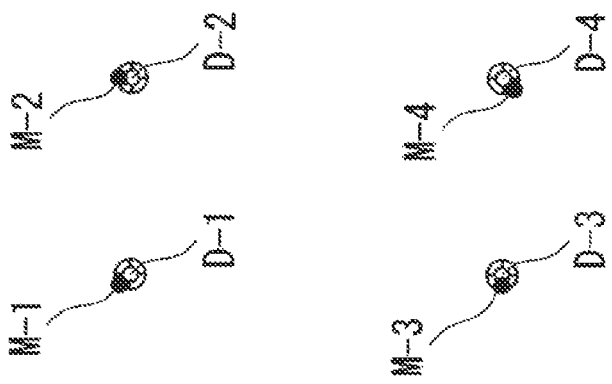

FIGS. 16A to 16C show examples of the amounts of shift of the markers M-1 to M-4 from the reference objects D-1 to D-4. FIG. 16A shows that the markers M-1 to M-4 are shifted from the reference objects D-1 to D-4 in different directions. FIG. 16B shows that the markers M-1 to M-4 are shifted from the reference objects D-1 to D-4 in the same direction by substantially the same amounts. FIG. 16C shows that the markers M-1 to M-4 coincide with the reference objects D-1 to D-4. In the state shown in FIG. 16A, in which the angle of radiation from the light curtain generator 20 and/or the distance Zos is unlikely to be preferable, one or both of them need to be adjusted. On the other hand, in the states shown in FIGS. 16B and 16C, in which the angle of radiation from the light curtain generator 20 and the distance Zos have been sufficiently adjusted, the user can complete the adjustment of installation of the light curtain generator 20. When the state shown in FIG. 16B is achieved, the user can cancel the amount of shift by performing predetermined operation on the operation section 41. The control unit 40 can, for example, cancel the shift by correcting the conversion map used by the position conversion section 44 in accordance with user's operation.

Outline

In the position detection apparatus according to the present embodiment, which is used to adjust the installation of the light curtain generator 20, the angle of radiation from the light curtain generator 20 is gradually adjusted from an angle away from the projection surface 50 toward an angle closer to the projection surface 50, and information that informs the user of completion of the first step adjustment at the timing when the reference objects placed on the projection surface 50 are detected is output, whereby the angle of radiation with respect to the projection surface 50 can be appropriately adjusted.

Further, the position detection apparatus according to the present embodiment projects on the projection surface 50 an image that specifies positions where the reference objects should be placed when the adjustment of installation of the light curtain generator 20 is performed, whereby the user can initiate the adjustment of installation of the light curtain generator 20 with simple operation.

Further, the position detection apparatus according to the present embodiment makes the adjustment until the amount of shift of each of the markers M-1 to M-4 from the corresponding one of the reference objects D-1 to D-4 reaches a fixed value or falls within a predetermined range and displays information that guides the user to complete the adjustment when the amounts of shift reach the fixed value or fall within the predetermined range, whereby the angle of radiation from the light curtain generator 20 and the distance between the radiated light and the projection surface 50 can be adjusted more appropriately.

Further, in the position detection apparatus according to the present embodiment, after the user places the reference objects on the projection surface 50, the user can make the adjustment while looking at a projection image displayed in a position close to the light curtain generator 20 instead of making the adjustment while looking at a captured image on a monitor located remote from the light curtain generator 20, whereby even a single person can readily adjust the light curtain generator 20.

Variations

How to implement the invention has been described with reference to the embodiment, but the invention is not limited to the embodiment in any sense, and a variety of changes and replacements can be made to the extent that they do not depart from the substance of the invention.

For example, in the embodiment described above, the adjustment mechanism that holds the light emitter 22 allows the user to manually adjust the distance Zos and the angle of radiation. The distance and the angle of radiation may instead be adjusted automatically in accordance with an instruction signal inputted, for example, from the control unit 40. In this case, the process in step S112 in the flowchart shown in FIG. 8 is changed to "The adjustment assistance control section 47 controls the adjustment mechanism that holds the light emitter 22 in such away that the angle of radiation from the light curtain generator 20 is gradually changed." Further, in this case, the process in step S116 is changed to "Output a signal for stopping driving the adjustment mechanism that holds the light emitter 22."

Figure 17:
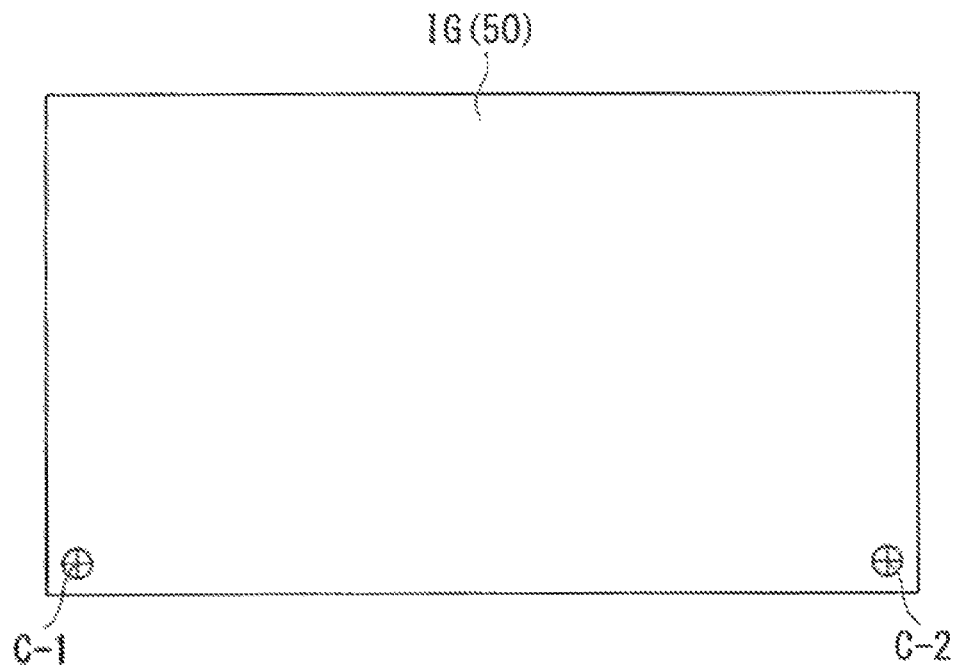
FIG. 17 shows another example of the installation adjustment guidance image.
Figure 18:
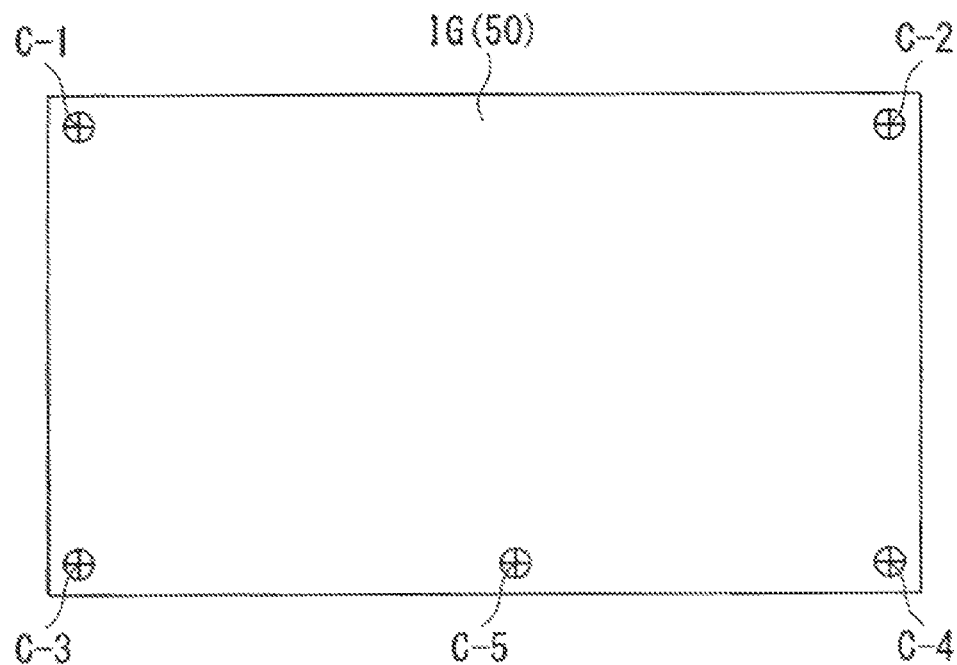
FIG. 18 shows another example of the installation adjustment guidance image.

Further, the reference object placement positions where a plurality of reference objects should be placed are not limited to the four corners of the projection surface 50. For example, the reference object placement positions may be set at the two corners away from the light curtain generator 20 as shown in FIG. 17 or may be set at five or more locations as shown in FIG. 18. Further, the projection of the installation adjustment guidance image IG may be omitted, and the user may place the reference objects at arbitrary points on the projection surface 50. FIGS. 17 and 18 show other examples of the installation adjustment guidance image IG.

Figure 19:
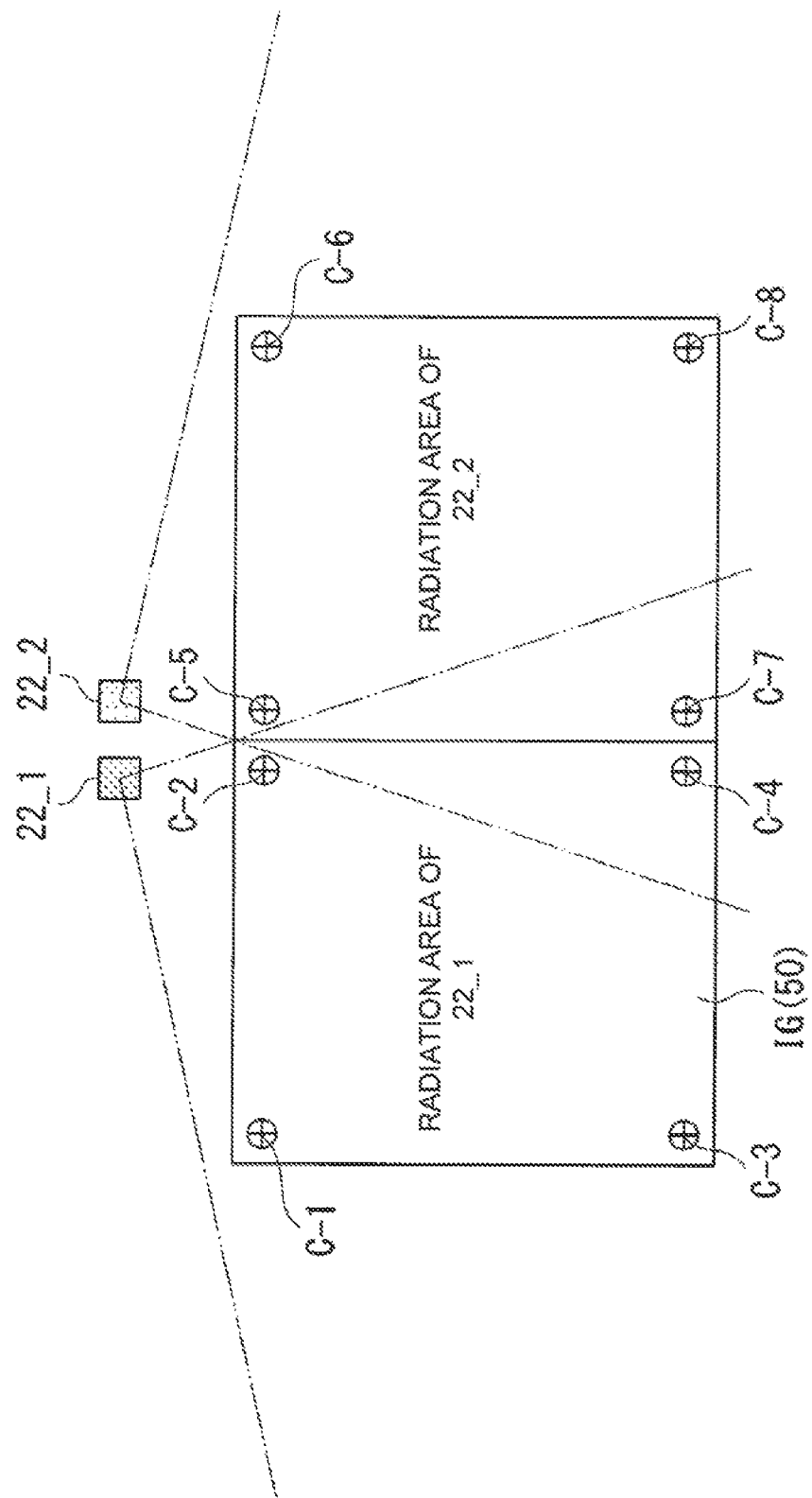
FIG. 19 shows that the light emitter is formed of a plurality of light emitters having different radiation areas and reference object placement positions are set in correspondence with the plurality of light emitters.

Further, when the light emitter 22 is formed of a plurality of light emitters having different radiation areas, the reference object placement positions where a plurality of reference objects should be placed may be set in correspondence with the radiation areas of the light emitters. FIG. 19 shows that the light emitter 22 is formed of a plurality of light emitters 22_1 and 22_2 having different radiation areas and the reference object placement positions are set in correspondence with the light emitter 22-1 and 22-2 (C-1 to C-4 corresponding to light emitter 22-1 and C-5 to C-8 corresponding to light emitter 22-2).

Further, in the position detection apparatus according to the present embodiment, each of the reference objects does not necessarily have a substantially cylindrical shape but can have a hemispherical shape, a rectangular columnar shape, or a variety of other shapes.

Further, in the position detection apparatus according to the present embodiment, the light curtain generator 20 may be replaced with an apparatus that radiates visible light or ultraviolet light.

What is claimed is:

1. A position detection apparatus comprising:
   a radiation section that radiates planar light along a target flat surface;
   a detection section that captures an image of an area irradiated with the light from the radiation section to detect the position of an object that reflects the light radiated from the radiation section; and
   an adjustment assistance section that transmits, when adjustment of installation of the radiation section is performed, a predetermined output based on a detection result obtained from the detection section when the detection section detects a reference object for the adjustment placed on the target flat surface.

2. The position detection apparatus according to claim 1, wherein when the adjustment of installation of the radiation section is performed, the angle of radiation from the radiation section is adjusted from an angle at which a radiation destination is away from the target flat surface toward an angle at which the radiation destination is closer to the target flat surface.

3. The position detection apparatus according to claim 1, wherein the reference object is formed of a plurality of objects the height of which from the target flat surface is substantially fixed in a state in which the reference objects are placed on the target flat surface, and
   the adjustment assistance section transmits the predetermined output when all the reference objects are detected by the detection section.

4. The position detection apparatus according to claim 1, further comprising a projection section that projects an image on the target flat surface,
   wherein when the adjustment of installation of the radiation section is performed, the adjustment assistance section instructs the projection section to project on the target flat surface an image that specifies a position where the reference object should be placed.

5. The position detection apparatus according to claim 4, further comprising an information output section that outputs information,
   wherein when the adjustment of installation of the radiation section is performed, the adjustment assistance section instructs the information output section to output information that guides placement of the reference object on the target flat surface in accordance with the image projected on the target flat surface and then instructs the information output section to output information that guides adjustment of the angle of radiation from the radiation section from an angle at which a radiation destination is away from the target flat surface toward an angle at which the radiation destination is closer to the target flat surface.

6. The position detection apparatus according to claim 1, further comprising a projection section that projects an image on the target flat surface; and
   an information output section that outputs information,
   wherein the reference object is formed of a plurality of objects the height of which from the target flat surface is substantially fixed in a state in which the reference objects are placed on the target flat surface, and
   the adjustment assistance section instructs the projection section to project a predetermined marker in the position of any of the reference objects detected by the detection section and instructs the information output section to output information that guides to make the adjustment until discrepancy between the projected marker and the detected reference object reaches a fixed value or falls within a predetermined range.

7. The position detection apparatus according to claim 1, further comprising a projection section that projects an image on the target flat surface; and
   an information output section that outputs information,
   wherein the reference object is formed of a plurality of objects the height of which from the target flat surface is substantially fixed in a state in which the reference objects are placed on the target flat surface, and the adjustment assistance section instructs the projection section to project a predetermined marker in the position of any of the reference objects detected by the detection section and instructs the information output section to output information that guides to complete the adjustment when discrepancy between the projected marker and the detected reference object reaches a fixed value or falls within a predetermined range.

8. The position detection apparatus according to claim 1, further comprising:

a drive section capable of adjusting the angle of radiation from the radiation section, wherein the adjustment assistance section outputs a signal for stopping the drive section based on a detection result obtained from the detection section when the detection section detects the reference objects.

9. A position detection apparatus comprising:

a radiation section that radiates planar light along a target flat surface;

a detection section that captures an image of an area irradiated with the light from the radiation section to detect the position of an object that reflects the light radiated from the radiation section;

an information output section that outputs information;

a projection section that projects an image on the target flat surface; and an adjustment assistance section that instructs, when adjustment of installation of the radiation section is performed, the projection section to project on the target flat surface an image that specifies a position where a reference object for radiation angle adjustment should be placed, instructs the information output section to output first information that guides placement of the reference object on the target flat surface in accordance with the projected image, and then instructs the information output section to output second information, wherein the second information guides adjustment of the angle of radiation from the radiation section from an angle at which a radiation destination is away from the target flat surface toward an angle at which the radiation destination is closer to the target flat surface until the detection section detects the reference object.

10. An adjustment method used with a position detection apparatus including a radiation section that radiates planar light along a target flat surface and a detection section that captures an image of an area irradiated with the light from the radiation section to detect the position of an object that reflects the light radiated from the radiation section, the method performing adjustment of installation of the radiation section and comprising:

causing the position detection apparatus to transmit a predetermined output, when the adjustment of installation of the radiation section is performed, based on a detection result obtained from the detection section when the detection section detects a reference object for the adjustment placed on the target flat surface.

11. An adjustment program stored in a non-transitory computer-readable storage medium that, when executed, causes a position detection apparatus including a radiation section that radiates planar light along a target flat surface and a detection section that captures an image of an area irradiated with the light from the radiation section to detect the position of an object that reflects the light radiated from the radiation section to assist adjustment of installation of the radiation section, the program causing, when the angle of radiation from the radiation section is adjusted, the position detection apparatus to carry out:

a process of causing the detection section to detect a reference object for the radiation angle adjustment placed on the target flat surface; and a process of transmitting a predetermined output based on a detection result obtained from the detection section when the detection section detects the reference object.

* * * * *